United States Patent [19]

Bjune et al.

[11] Patent Number: 4,465,569
[45] Date of Patent: Aug. 14, 1984

[54] METHOD OF PRODUCING ZINC FROM CHLORIDE SOLUTIONS WHICH CONTAIN CHIEFLY IRON, COPPER AND ZINC

[76] Inventors: Arne Bjune, Hillaveien 34, 2013 Skjetten; Gunnar H. Boe, Fuglevikkleiva 40, 4600 Kristiansand; Tore Danielssen, Åsveien 20, 4620 Vågsbygd, all of Norway

[21] Appl. No.: 512,726

[22] Filed: Jul. 11, 1983

Related U.S. Application Data

[60] Division of Ser. No. 262,299, May 11, 1981, Pat. No. 4,421,616, which is a continuation-in-part of Ser. No. 255,475, Apr. 20, 1981, abandoned, which is a continuation of Ser. No. 137,569, Apr. 7, 1980, abandoned.

[30] Foreign Application Priority Data

Apr. 17, 1979 [NO] Norway ............................... 791261

[51] Int. Cl.³ ............................ C25C 1/16; C25G 9/00
[52] U.S. Cl. ..................................... 204/115; 204/118; 423/100
[58] Field of Search ................... 204/115, 118; 423/99, 423/100

[56] References Cited

U.S. PATENT DOCUMENTS

3,441,372 4/1969 Pegler et al. ........................ 423/100
4,288,304 9/1981 De Marthe et al. ................ 204/111

Primary Examiner—John F. Niebling

[57] ABSTRACT

Selective extraction of zinc from chloride solutions which contain iron, copper and zinc, where the zinc is extracted in organic phase by means of tri-n-butylphosphate in an organic solvent. The extraction is carried out on chloride solutions in which the lead contents is possibly lowered and where the copper contents is maximum 50 grams per liter higher copper concentration being reduced for instance by electrolysis in diaphragm cell. The zinc containing organic phase is washed, and zinc back-extracted and conducted to a diaphragm cell for electrolysis of zinc, the used electrolyte being returned to the back-extraction step. The raffinate from the zinc extraction is used for repeated leaching of metals after preceding reoxidation.

12 Claims, 3 Drawing Figures

METHOD OF PRODUCING ZINC FROM CHLORIDE SOLUTIONS WHICH CONTAIN CHIEFLY IRON, COPPER AND ZINC

This is a divisional of application Ser. No. 262,299 filed May 11, 1981, U.S. Pat. No. 4,421,616, which is a continuation-in-part of application Ser. No. 255,475 filed Apr. 20, 1981, now abandoned, which is a continuation of application Ser. No. 137,569 filed Apr. 7, 1980, now abandoned.

The invention relates to a method of producing zinc by liquid-liquid extraction from chloride solutions which contain iron, copper and zinc and subsequent electrolysis of zinc from the chloride solution and particularly at removing zinc from those solutions which are formed when complex copper-zinc-lead ores are leached with iron chloride in processes which are known per se. The extraction is carried out on that solution which is formed when the contents of copper possibly has been lowered in known way.

By the method of the invention the lead is, if necessary, precipitated as lead chloride in known way by crystallization at lowered temperature, whereupon the extraction of zinc is carried out on the residual solution, possibly after removal or reduction of the copper contents. The zinc is extracted into the organic phase by means of tri-n-butyl-phosphate (TBP) diluted in an organic solvent, whereupon the organic phase and the lye is separated. The organic phase is before the back-extraction washed with a portion of the product solution in order to remove the chief part of co-extracted copper and iron. Used zinc chloride electrolyte from the subsequent zinc chloride electrolysis is utilized for the back extraction, and the resulting product solution is cleaned for iron and copper and other impurities by known methods and possibly supplied with an organic glazing means of for instance polyacryl type. The zinc chloride electrolysis is preferably carried out in a diaphragm cell. As diaphragm there can be used different qualities of artificial fiber cloth as for instance polypropylene or teflon cloth and there is preferably used DS-anodes and aluminum cathodes. That chlorine which is developed on the anodes is returned to the process, while the zinc is precipitated on the cathodes and removed regularly.

In order to obtain a selective zinc chloride extraction from iron-copper-zinc chloride lye which is formed after the possible reduction of the contents of lead, it is important that the copper concentration does not exceed a certain value, and the inventors have found that the copper concentration should not exceed 50 grams per liter. If the copper concentration in the lye is to be reduced, a part of the copper can be removed in known way, for instance by cementation, electrolysis or hydrogen reduction. The reduction of the copper contents is carried out until the copper concentration has reached the desired value. The feed solution to the zinc extraction step can for instance be taken from the catholyte solution in the copper electrolysis. The zinc concentration in this solution is unaltered.

EXAMPLE I

A bulk concentrate containing iron, copper, zinc and lead with 11% Cu, 25% Fe, 18.4% Zn and 3.7% Pb was leached with a chloride solution containing iron, copper, zinc and lead, and the lead concentration was reduced by crystallization in known way. The lye after the lead crystallization contained 46 grams per liter Cu, 180 grams per liter Fe, 92 grams per liter Zn and 5 grams per liter Pb. In order to reduce the copper concentration to about 25 grams per liter Cu, the solution was first conducted to a diaphragm cell in which it was electrolyzed until the desired concentration was obtained. From the catholyte compartment of the electrolysis cell the solution with the reduced copper contents was conducted to the continuously operating extraction equipment in which the zinc chloride was extracted with TBP diluted by Solvesso 150. The organic phase which contained 22.4 grams per liter Zn was first washed with a part of the product solution from the back extraction step, whereupon it was back extracted with used zinc chloride electrolyte from the zinc electrolysis. This contained 25 grams per liter Zn. The concentration of zinc was hereby increased to 60 grams per liter (g/l hereinafter). Some iron, copper and other impurities was also back extracted, and impurities were as mentioned above removed from the so formed product solution to a content which can be tolerated by the known methods for zinc electrolysis. The product solution was supplied with an organic glazing means in a concentration of 5 parts per million (ppm) and electrolyzed in a diaphragm cell with DS-anodes and aluminum cathodes. The diaphragm consisted of a polypropylene cloth. The ingoing electrolyte (product solution) contained 60 g/l Zn and 4 g/l HCl, while the outgoing contained 25 g/l Zn and 0.5 g/l HCl. The outgoing electrolyte was as mentioned above returned to the back extraction step. The raffinate from the zinc extraction can be used for another leaching of metals after being reoxidized in known way.

EXAMPLE II

A sulfidic bulk concentrate containing iron, copper, zinc, and lead has been leached with chloride leach liquor by the known red-ox principle. The active oxidized species in the liquor are the ferric ions, and the metal sulfides are attacked according to the equations:

$$3\ FeCl_3 + CuFeS_2 = CuCl + 4\ FeCl_2 + S° \quad (1)$$

$$ZnS + 2\ FeCl_3 = ZnCl_2 + FeCl_2 = S° \quad (2)$$

$$PbS + 2\ FeCl_3 = PbCl_2 + 2\ FeCl_2 + S° \quad (3)$$

A small amount of the elementary sulfur formed by reactions (1) through (3) is oxidized further to sulfate:

$$6\ FeCl_3 + 4\ H_2O + S° = 6\ FeCl_2 + 6\ HCl + H_2SO_4 \quad (4)$$

Pyrite ($FeS_2$) in the concentrate is not attacked by the ferric ions.

The composition of the leach liquor going into the leach system is (all analyses in g/l):

| $Fe_{tot}$ | $Fe^{3+}$ | $Fe^{2+}$ | $Cu_{tot}$ | $Cu^{2+}$ | $Cu^+$ | Zn | Pb | HCl | $SO_4^{2-}$ |
|---|---|---|---|---|---|---|---|---|---|
| 150 | 135 | 15 | 25 | 25 | 0 | 48.1 | 21.1 | 4.0 | 5.0 |

To this leach liquor was added a sulfide concentrate with analysis shown below (weight percent):

| Zn | Cu | Pb | S |
|---|---|---|---|
| 29.0 | 7.7 | 8.1 | 40 |

Figure 1:
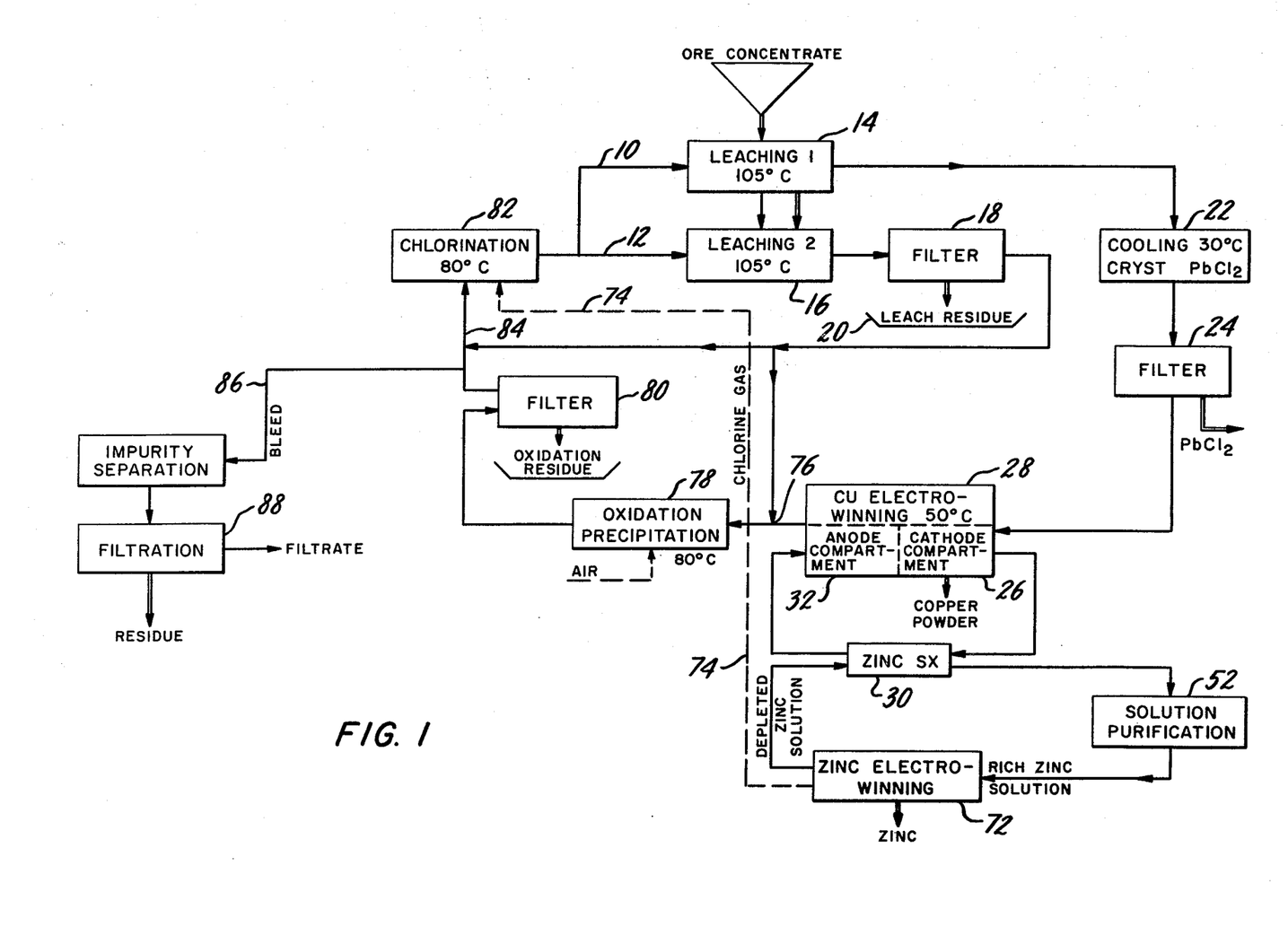
FIG. 1 illustrates a preferred closed loop process in a second embodiment of the present invention described in Example II below.

The leaching was performed in an apparatus described in a copending application. Referring to FIG. 1, the leach liquor to the leaching system is split in two parallel streams. The main (primary) stream 10 is used in a substoichiometric leach with respect to available sulfides in the concentrate, and the secondary stream 12 is used in a superstoichiometric leach on the residue from the primary leach.

With this particular concentrate, the primary leach operation was done at 14 in two tanks, each of 30 liter capacity and made of glassfibre-reinforced polyester (GRP), connected in series. Each tank was equipped with a stirrer of the propeller type, and baffles, to avoid settling of solids in the tanks during operation.

The concentrate was fed to the first leach tank by means of a vibrating screw-feeder and at a rate that gave an amount of leach liquor substoichiometrically to the available metal sulfides in the concentrate.

The ratio of concentrate to leach liquor was 360 grams concentrate per liter of leach liquor added.

The residence time in each tank was one hour, and the temperature 105° C. The slurry from tank No. 1 was fed into tank No. 2 via an overflow connection.

The slurry out of tank No. 2 was pumped to a conventional thickener (not shown) made of rubber-coated steel. The underflow from the thickener, containing the solids, was sent to the secondary leach at 16 for an essentially complete extraction of the remaining metal values.

The remaining solids from the secondary leach, composed mainly of gangue and sulfur, were taken out in a filter press 18 made of polypropylene and operated at 105° C. The fresh leach liquor addition to the secondary stage was, with this particular concentrate, added at a rate that ensured a red/ox potential in the secondary leach tank of 500 mV as measured with the Pt/calomel couple. This ensures essentially complete extraction of the remaining metals in the residue from the primary leach stage.

The leach residue at 20 was washed countercurrently with the HCl solution resulting from the zinc chloride purification (see later).

The overflow from the thickener, containing the metal values as chlorides, and essentially reduced (i.e. no ferric present, and only traces of cupric) was pumped to the lead chloride crystallization stage 22. The analysis of the liquid overflow from the thickener, before entering the crystallizer at 22 was (analysis in g/l):

| $Fe_{tot}$ | $Fe^{3+}$ | $Fe^{2+}$ | $Cu_{tot}$ | $Cu^{2+}$ | $Cu^+$ | Zn | Pb | HCl | $SO_4^{-2}$ |
|---|---|---|---|---|---|---|---|---|---|
| 153 | 0 | 153 | 38 | 5 | 33 | 104 | 30 | 19.5 | 11.4 |

The crystallizer itself was of the known vacuum-flash type. The temperature of the entering liquid is lowered from the initial 105° C. down to 10° C. by reducing the pressure above the liquid and boiling off water. The lead chloride was collected in a fluidized bed of circulating crystals.

The materials of construction of the crystallizer are titanium and glass in all parts in contact with the liquid. Fluidization of lead chloride crystals was achieved by means of an internal circulation of liquid by a titanium propeller.

The lead chloride particles formed in the circulating liquid grow to a definite size and drop out of the bed and down to the bottom, whereby they are intermittently removed via a barometric leg.

The liquid leaving the crystallizer has the following composition (analysis in g/l):

| $Fe_{tot}$ | $Fe^{3+}$ | $Fe^{2+}$ | $Cu_{tot}$ | $Cu^{2+}$ | $Cu^+$ | Zn | Pb | HCl | $SO_4^{2-}$ |
|---|---|---|---|---|---|---|---|---|---|
| 186.3 | 0 | 186.3 | 46.4 | 6.0 | 40.4 | 126.5 | 12.0 | 23.7 | 13.9 |

The increases in iron, copper, zinc, hydrochloric acid, and sulfate concentrations are due to the water evaporation in the vacuum flashing of the hot incoming liquid.

The main part of the lead carried into the system by the concentrate is removed as lead chloride in this step. The balance is precipitated as lead jarosite in the oxidation step.

The produced lead chloride is washed on a filter at 24 and the used wash-water added to the process stream. This decreases the concentrations somewhat (analysis in g/l):

| $Fe_{tot}$ | $Fe^{3+}$ | $Fe^{2+}$ | $Cu_{tot}$ | $Cu^{2+}$ | $Cu^+$ | Zn | Pb | HCl | $SO_4^{2-}$ |
|---|---|---|---|---|---|---|---|---|---|
| 185.2 | 0 | 185.2 | 46.2 | 6.0 | 40.2 | 125.8 | 12.0 | 23.5 | 13.8 |

This liquid is fed to the cathode compartment 26 in the known copper electrowinning diaphragm cell 28 and is totally reduced by the influence of the current flowing in the cell. The necessary amount of copper to balance out the amount added in the concentrate feed is deposited on the cathodes as a powder, which falls off and sinks to the bottom of the cell. The bottom of the cell is conical, to achieve good collection of the produced copper powder. The powder is intermittently removed from the bottom through an air-operated valve.

Materials of construction in the copper electrowinning cell 28 are GRP and rubber in all parts that are in contact with the liquid. The cathodes were made of titanium, and the anodes were of the so-called DSA type (dimensionally stable anodes, titanium with a noble metal oxide layer).

The electrolysis temperature was in the range of 40°–90° C.

The catholyte in the copper electrowinning cell is used as feed to the zinc solvent extraction at 30. The produced raffinate is returned to the anode compartment 32 of the copper EW cell 28. The importance and great advantage of using the catholyte as feed to the SX system lies in the very large difference in the distribution coefficients for zinc chloride and iron (III) chloride. The table below gives measured values of these coefficients in the actual chloride solution, with the used tri-n-butyl phosphate extractant:

| | | |
|---|---|---|
| $D_{Zn}$ | = | 0.25 |
| $D_{Fe\,(III)}$ | = | 10 |
| $D_{Fe\,(II)}$ | = | 0.012 |
| $D_{Cu\,(I)}$ | = | 0.082 |
| $D_{Cu\,(II)}$ | = | 0.008 |

As one sees, the importance of keeping oxidized species (Cu (II) and Fe (III)) at as low as possible values cannot be stressed enough. The influence of copper (II) is caused by the equilibrium between the oxidized and reduced species in the solution:

$$Cu^{2+} + Fe^{2+} = Cu^{+} + Fe^{3+} \qquad (5)$$

This equilibrium will be disturbed when contacting a solution with essentially no iron (III), but measurable amounts of copper (II), with an extractant with a strong affinity for iron (III), as the case is with TBP:

$$Cu^{2+} + Fe^{2+} = Cu^{+} + Fe^{3+} \qquad (6)$$
$$\downarrow TBP$$
$$Fe(III)\ TBP$$

We therefore run the electrolysis at 28 at a red/ox potential (less than 300 mV) that assures us that no ferric is present in the catholyte, and that all the copper is in the cuprous state. This catholyte, with an analysis as given below (analysis in g/l):

| $Fe_{tot}$ | $Fe^{3+}$ | $Fe^{2+}$ | $Cu_{tot}$ | $Cu^{2+}$ | $Cu^{+}$ | Zn | Pb | HCl | $SO_4^{2-}$ |
|---|---|---|---|---|---|---|---|---|---|
| 182.7 | 0 | 182.7 | 25.9 | 0 | 25.9 | 124.7 | 11.9 | 23.4 | 13.7 |

The other important advantage of using the catholyte as fed to the SX stage is that copper is at its lowest concentration in this liquid, and coextraction of copper is therefore minimized.

The drop in copper content reflects the production of the same amount of copper that was dissolved from the concentrate in the leaching operation. The small drop in the concentration of the other elements present is caused by washing of the produced copper powder at 26 with water, and the returning of the wash-water to the process solution.

Figure 2:
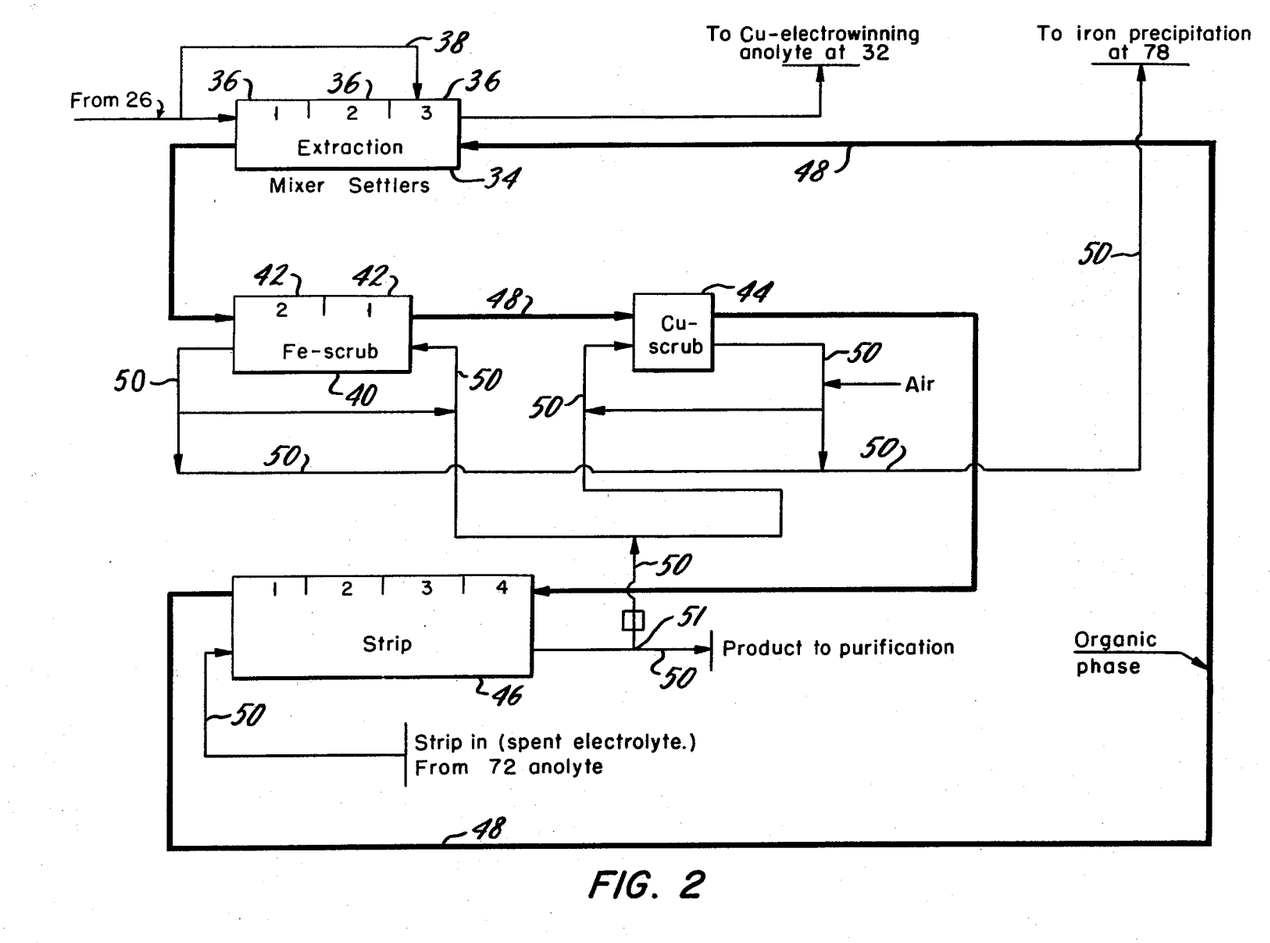
FIG. 2 is a flow diagram of a preferred system for organic extraction of zinc in Example II.

FIG. 2 illustrates a preferred system of TBP solvent extraction of zinc but it will be understood that any conventional extraction and scrub system may be employed. The catholyte from 26 is fed to the mixer-settlers 34 of solvent extraction at 30 where it is contacted with the organic extractant tri-n-butyl-phosphate (TBP). The extractant was diluted with a commercial available diluent, Exxon Solvesso 150. The concentration of the extractant TBP in the diluent was 40 volume percent. The feed solution was cooled to 30° C. by passing it through a titanium heat exchanger (not shown) before it entered the mixer-settlers.

The mixer-settlers 36 were of the known pump-mix type, made in glassfibre reinforced polyester. The dimensions of the mixer (L×W×H) were 200×200×200 mm, and the adjoining settler (L×W×H) 500×200×200 mm. The mixer-settlers were equipped with lids. A guiding plate (not shown) was located at the inlet of the settler to lower the linear velocity of the emulsion from mixer and inject it at the interphase of the settler. The impellers, with 6 radial blades on both sides, were made in polypropylene. They had a diameter of 100 mm and were operated at 425 rpm. Connections and piping were mostly made in polypropylene, but some polyethylene and a special brand of rubber hose were also used.

Piston type dosage pump were used for metering all the aqueous flows, except for the two recirculating aqueous scrub phases where centrifugal pumps were used. A pneumatic metering pump completely in teflon and glass for all parts in touch with liquid to be pumped, was employed for the organic phase.

Because of the pulsation created by the piston pumps, these flow rates were controlled simply by measuring the amount of liquid within a certain time. The flow rates in the circuits belonging to the centrifugal pumps were checked by rotameters.

The extraction section consists of three mixer-settler stages 36. A fraction of the feed liquor is fed at 38 directly to the last extraction stage, to avoid crud formation due to low acidity, which is caused by the tendency of TBP to extract hydrochloric acid.

The iron scrub at 40 consists of two stages 42, to scrub out most of the coextracted iron. As ferric is extracted to a much higher extent than ferrous, it is essential that both the extraction and the iron-scrub stages are kept inert, and at a low red/ox potential in the aqueous phases.

The copper-scrub section 44 has one stage only. The section is operated under oxidizing conditions, using air as oxidizing agent in the aqueous phase. The reason is that cuprous is more readily extracted by TBP that cupric. Coextracted copper is thus scrubbed out of the organic phase rather effectively by air oxidized aqueous phase. As indicated on the flowsheet in FIG. 2, air is injected only into the aqueous phase. This is performed in a surge/pump tank for the recirculating aqueous phase.

The strip section 46 consists of four stages.

The storage/surge tank for organic phase is not shown on the flowsheet. The tank was located between the strip and the extraction sections 46 and 34, respectively. Further, a tank (not shown) was installed in the raffinate stream to prevent break-through of organic phase to the copper electrowinning cell in case of improper interphase level in the settler of the third extraction stage 36. The tank was supplied with a baffle to let the underflow only to the copper cell.

The preferred flow of liquids in the extraction, scrub and strip stages is illustrated in FIG. 2. As there shown, the TBP is continuously circulated in a closed loop as shown by the heavy black line 48 of FIG. 2. Preferably the extraction at 34 is effected by countercurrent flow of TBP with respect to the catholyte from 26 and if desired any conventional solvent extraction may be employed in place of the mixer-settlers 36.

The aqueous medium used in the stripping and scrub stages is preferably the spent electrolyte from the zinc electrolysis (later described) and the flow of this aqueous medium is shown in the lighter line 50 of FIG. 2. Stripping of the TBP at 46 is carried out in conventional apparatus and preferably mixer-settlers 36 are employed in which the aqueous medium and TBP flow countercurrently. A portion (approximately 10%) of the aqueous medium rich in zinc is bled off at 51 for use in the iron and copper scrub steps at 40 and 44 respectively. Scrubbing is carried out in conventional apparatus such as mixer-settlers 36 and the aqueous scrub solution from 40 and 44 is fed back into the closed loop of the main circuit after the copper electrowinning cell 28 for oxidation and precipitation of iron. The aqueous medium rich in zinc from the strip stage 46 if necessary is pumped to a solution purification at 52 (FIG. 1) to remove any remaining iron and copper and other impurities prior to zinc electrolysis.

The raffinate from the extraction step 34 is returned to the copper electrowinning cell, and purged into the anode compartment 32 of the cell 28.

The analysis of the raffinate to 32 is as follows (g/l):

| $Fe_{tot}$ | $Fe^{3+}$ | $Fe^{2+}$ | $Cu_{tot}$ | $Cu^{2+}$ | $Cu^+$ | Zn | Pb | HCl | $SO_4^{2-}$ |
|---|---|---|---|---|---|---|---|---|---|
| 188.2 | 0 | 188.2 | 23.3 | 0 | 23.3 | 18.8 | 13.5 | 24.6 | 15.5 |

The necessary amount of $ZnCl_2$ in the catholyte from 26 is extracted at 34 into the organic phase together with small amounts of copper and iron. The phase volume ratio of aqueous feed flow/organic flow was 0.146.

The concentration profiles over the extraction-, scrub- and strip stages in the SX sequence shown in FIG. 2 were (all values in g/l):

| Stage | Zinc | | Copper | | Iron | |
|---|---|---|---|---|---|---|
| | Organic | Aqueous | Organic | Aqueous | Organic | Aqueous |
| Extraction 3 | 9.80 | 13.8 | 1.80 | 21.8 | 2.10 | 175.0 |
| Extraction 2 | 15.40 | 57.5 | 2.18 | 25.3 | 2.40 | 180.2 |
| Extraction 1 | 18.00 | 101.1 | 2.60 | 25.9 | 2.66 | 182.6 |
| Iron scrub 2 | 18.40 | 83 | 1.72 | 36.0 | 0.96 | 80.1 |
| Iron scrub 1 | 19.20 | 84 | 1.60 | 34.5 | 0.74 | 80.2 |
| Copper scrub | 19.40 | 83 | 0.24 | 89.0 | 0.70 | 13.7 |
| Strip 4 | 11.0 | 75.0 | 0.0031 | 0.53 | 0.0302 | 2.5 |
| Strip 3 | 6.14 | 49.1 | 0.0016 | 0.013 | 0.0060 | 0.092 |
| Strip 2 | 3.36 | 33.6 | 0.00084 | <0.002 | 0.0018 | 0.010 |
| Strip 1 | 1.80 | 25.6 | 0.00068 | <0.002 | 0.001 | <0.005 |
| Strip in | — | 22.0 | — | 0 | — | — |
| Extraction feed in | — | 124.7 | — | 25.9 | — | 182.7 |

The iron scrub at 40 was 7.6 volume percent of strip in, and the copper scrub at 44 was 3.6 volume percent of strip in.

The strip solution out of mixer-settler 46 No. 4 (strip 4) was approximately equal to the amount of feed solution to the extraction step.

Figure 3:
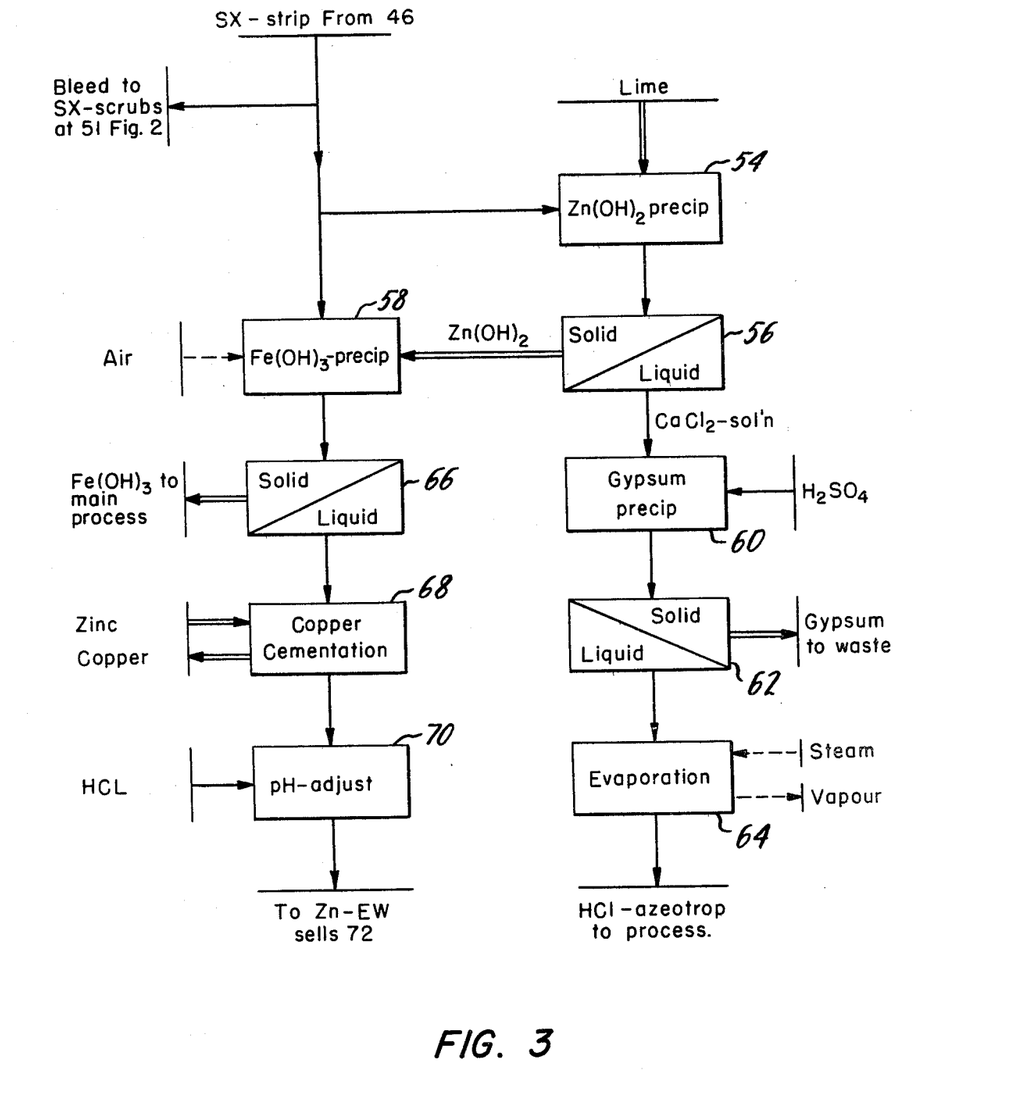
FIG. 3 is a flow diagram of a preferred system for purifying the zinc rich aqueous medium before zinc electrolysis in Example II.

This solution from 46 was submitted to a purification treatment at 52 to decrease the concentrations of iron and copper to acceptable levels. The procedure for the iron removal is shown schematically in FIG. 3. A part of the solution from strip stage 4 (approximately 10%) is treated with lime at 54 to achieve a precipitation of the zinc in the solution as zinc hydroxide.

$$CaO + ZnCl_2 + H_2O = Zn(OH)_2(s) + CaCl_2 \quad (7)$$

The other metals contained in this stream is similarly precipitated as hydroxides. The pH of the resulting solution is around 7.

The produced zinc hydroxide, (eq. 7), also containing the copper and iron precipitate, was separated in conventional manner at 56 from the resulting calcium chloride solution and used as a base to treat the main amount of strip solution at 58.

The calcium chloride solution from the zinc hydroxide precipitation was treated with sulfuric acid at 60 to generate HCl and deposit calcium as gypsum:

$$CaCl_2 + H_2SO_4 + 2 H_2O = CaSO_4.2 H_2O(s) + 2 HCl \quad (8)$$

After filtering of the gypsum at 62, the HCl solution was concentrated at 64 and the resulting HCl solution was utilized in the main leaching circuit for washing purposes, to maintain the chloride and red/ox balance in the process as desired.

The zinc hydroxide was added to the main strip solution at 58 to adjust the pH in this solution to 2-2.5, and at the same time air was injected into the solution to oxidize ferrous ions to ferric, and precipitate ferric hydroxide:

$$Zn(OH)_2(s) + FeCl_2 + \tfrac{1}{2} H_2O + \tfrac{1}{4} O_2 = ZnCl_2 + Fe(OH)_3(s) \quad (9)$$

The precipitation reaction was done in a stirred GPR vessel at 80° C. and the resulting iron precipitate was taken out by filtration at 66.

The filtrate was pumped to a second GRP tank 68 equipped with stirrer, and here zinc dust was added to precipitate copper:

$$Zn(s) + CuCl_2 = Cu(s) + ZnCl_2 \quad (10)$$

Copper cement was removed in a small rubber-lined steel thickener. The purified solution was then readjusted to pH 1 at 70 before entering the zinc electrowinning cell 72 (FIG. 1). The analysis of the feed solution to the zinc cell 72 is (g/l):

| Zn | HCl | |
|---|---|---|
| 78 | 3.5 | Nb iron, copper, lead or sulfate. |

The electrolysis was done in a conventional diaphragm cell 72 made from GRP with aluminum cathodes (0.5 m² each) and DSA. Diaphragms were made of polypropylene fabric. In this cell, zinc chloride was decomposed:

$$ZnCl_2 = Zn(s) + Cl_2(g) \quad (11)$$

Zinc is deposited on the aluminum cathodes as a solid layer, and the cathodes were stripped every 24 hours. The chlorine gas evolved on the DSA's were returned to the oxidation stage at 74 in the main process to achieve chlorine as well as red/ox balance.

The cathodic current density used in cell 72 was 400 Am$^{-2}$, and the anodic current density somewhat higher.

Anolyte from the zinc electrowinning cell, now depleted down to 20 g/l zinc, was returned to the strip stagge 46 via a chlorine strip tower (not shown) to remove dissolved chlorine gas. In this tower, made of polypropylene and filled with ceramic saddles, and with a height of 4 m and a diameter of 20 cm, the dissolved chlorine was stripped with compressed air. The resulting air/chlorine mixture was also returned to the oxidation stage at 74 in the main hydrometallurgical circuit.

The liquor from the secondary leach stage 16, 18 and the anolyte from the copper electrowinning operation at 28 may be combined at 76 to enter the air oxidation equipment 78. The analysis of this solution was (g/l):

| Fe$_{tot}$ | Fe$^{3+}$ | Fe$^{2+}$ | Cu$_{tot}$ | Cu$^{2+}$ | Cu$^+$ | Zn | Pb | HCl | SO$_4^{2-}$ |
|---|---|---|---|---|---|---|---|---|---|
| 155.2 | 58.3 | 96.9 | 25.2 | 8.0 | 17.2 | 48.4 | 21.6 | 14.0 | 9.5 |

Equipment 78 consisted of a GRP tank with effective volume 60 liters, with air distribution in the bottom and an impeller-type air disperger operated at 550 rpm. The temperature was maintained at 80° C. in this tank by means of electric heating elements.

In the air oxidation stage, the iron dissolved in the leach stages is precipitated, partially as sodium jarosite, partially as goethite, and excess acid produced in the leaching of sulfur is used up. Sodium for the jarosite precipitation is added as NaCl. The sulfur oxidized to sulfate in the leaching is also taken care of:

Jarosite formation and sulfate removal at 78:

NaCl + ½ O$_2$ + 6 FeCl$_2$ + 2 H$_2$SO$_4$ + 3 H$_2$O = (12)

NaFe$_3$(SO$_4$)$_2$(OH)$_6$(s) + 3 FeCl$_3$ + 4 HCl

A small part of the solubilized lead is precipitated as lead jarosite.

Excess acid removal:

HCl + ¼ O$_2$ + FeCl$_2$ = FeCl$_3$ + ½ H$_2$O (13)

Goethite precipitation:

3 FeCl$_2$ + ¾ O$_2$ + ½ H$_2$O = FeO.OH(s) + 2 FeCl$_3$ (14)

HCl and sulfate is consumed, and the red/ox potential partly restored. The jarosite/goethite precipitate amounts to 18 g/l solution. This precipitate is taken out in a polypropylene filter press at 80.

The residue collected in the filter press was washed countercurrently in three stages with water, and the washwater from the last stage added to the main process stream.

The partially oxidized solution, with analysis (g/l) as given below, enters the chlorine oxidation stage at 82.

| Fe$_{tot}$ | Fe$^{3+}$ | Fe$^{2+}$ | Cu$_{tot}$ | Cu$^{2+}$ | Cu$^+$ | Zn | Pb | HCl | SO$_4^{2-}$ |
|---|---|---|---|---|---|---|---|---|---|
| 150 | 63 | 87 | 25 | 25 | 0 | 48.4 | 21.6 | 4.0 | 5.0 |

The chlorine oxidation stage 82 is made of a chlorination tower, with height 1.5 m and 20 cm diameter. The tower is filled with ceramic saddles. The partially oxidized solution with the above-mentioned composition was introduced at the top of this tower at a temperature of 80° C., and the chlorine/air gas mixture at the bottom. In its passage down the length of the tower, the solution was oxidized back to its original strength with the chlorine gas coming from the zinc electrowinning operation. The exhaust gas from the oxidation tower was free from chlorine and could be released to the atmosphere. The reason for this is that residual concentration of 15–25 g/l of ferrous ions is always maintained in the outgoing liquid from the chlorine oxidation tower. The oxidation reaction is:

FeCl + ½ Cl$_2$(g) = FeCl$_3$

The regenerated liquid is now again pumped to the leach section, thus making the process cycle a closed loop.

If desired, the liquor from secondary leaching 16, 18 which has not gone through the metal recovery loop may be fed directly to the chlorine oxidation stage at 84.

About 5 to 10 percent of leach liquor is preferably bled off at 86 for separation of solid impurities as by filtration at 88. The filtrate is recycled back to the main stream of leach liquor.

It will be understood that all changes and modifications of the preferred embodiments of the invention herein chosen for the purpose of illustration which do not depart from the spirit and scope of the invention are intended to be covered.

What is claimed is:

1. Method for producing zinc metal from chloride solutions containing iron, copper and zinc by liquid-liquid extraction and electrolysis which comprises the steps of:
   (a) forming a chloride solution containing iron, copper and zinc chlorides which contains not more than about 50 grams per liter of copper,
   (b) contacting said chloride solution with tri-n-butylphosphate which selectively extracts and removes zinc chloride from the iron and copper chlorides in said solution,
   (c) contacting said tri-n-butylphosphate with an aqueous medium which extracts and removes zinc chloride from said tri-n-butylphosphate,
   (d) feeding the aqueous medium with said extracted zinc chloride into an electrolytic cell in which zinc metal is deposited at the cathode by electrolysis and removed from the cell, and
   (e) recycling used electrolyte from the cell as the aqueous medium for extracting and removing zinc chloride from said tri-n-butylphosphate.

2. The method of claim 1 which includes the step of adding organic glazing means to said aqueous medium prior to electrolysis in said cell.

3. Method for producing zinc metal from materials containing copper, iron, zinc and lead by liquid-liquid extraction and electrolysis which comprises the steps of:
   (a) leaching said material with an aqueous chloride solution to extract copper, iron, zinc and lead as chlorides in solution from said material,
   (b) separating lead chloride from said resulting chloride solution by crystallizing lead chloride and removing the lead chloride crystals from said solution,
   (c) subjecting said solution to electrolysis in a diaphragm cell to remove copper and reduce the content of copper in said chloride solution to not more than about 50 grams per liter, (d) feeding the chloride solution which contains not more than about 50 grams of copper per liter from said cell into contact with tri-n-butylphosphate to selectively extract and remove zinc chloride from said chloride solution, (e) contacting said tri-n-butylphosphate with an aqueous medium to extract and remove zinc chloride from said tri-n-butylphosphate, (f) feeding the aqueous medium with said extracted zinc chloride into an electrolytic cell in which zinc metal is deposited at the cathode and removed from the cell, and (g) recycling used electrolyte from the cell as the aqueous medium for extracting and removing zinc chloride from said tri-n-butylphosphate.

4. Method for producing zinc metal from chloride solutions containing iron, copper and zinc by liquid-liquid extraction and electrolysis which comprises the steps of:

(a) forming an aqueous chloride solution containing iron, copper and zinc chlorides which contains not over about 50 grams per liter of copper chloride, (b) contacting said aqueous chloride solution with tri-n-butylphosphate which extracts and removes metal chlorides and chiefly zinc chloride from said aqueous chloride solution, (c) contacting said tri-n-butylphosphate with an aqueous medium to remove metal chlorides from said tri-n-butylphosphate, (d) separating iron and copper chlorides from said aqueous medium and thereafter, (e) feeding said aqueous medium rich in zinc chloride into an electrolytic cell in which the zinc metal is deposited at the cathode by electrolysis and removed from the cell.

5. The method of claim 4 which includes the steps of separating iron and copper chlorides from said aqueous medium by precipitating zinc hydroxide from a portion of said aqueous medium and, feeding the zinc hydroxide back into the remainder of said aqueous medium to precipitate iron as ferric hydroxide from said aqueous medium, removing the ferric hydroxide from said aqueous medium and, adding zinc dust to said aqueous medium to precipitate copper metal from said aqueous medium.

6. The method of claim 4 in which a portion of the aqueous medium after contacting the tri-n-butylphosphate is recycled to contact the tri-n-butylphosphate prior to the step of removing metal chlorides with said aqueous medium to separate a portion of the iron and copper chlorides from said tri-n-butylphosphate.

7. The method of claim 4 in which electrolyte from the electrolytic cell is recycled as the aqueous medium for contacting said tri-n-butylphosphate.

8. The method for producing zinc metal from materials containing copper, iron, zinc and lead which comprises the steps of:

(a) leaching said material with an aqueous chloride liquor to extract copper, iron, zinc and lead as chlorides in a primary leaching stage, (b) separating said material from said primary liquor and subjecting said material to a second secondary leaching step with aqueous chloride liquor to further extract metal chlorides from said material, (c) separating lead chloride from said primary liquor, (d) subjecting said primary liquor to electrolysis to remove copper and reduce the copper in said primary liquor to not more than about 50 grams per liter, (e) contacting said primary liquor containing not more than about 50 grams per liter of copper with tri-n-butylphosphate to extract and remove metal chlorides and chiefly zinc chloride from said primary liquor, (f) thereafter subjecting said primary liquor to regeneration by oxidation and chlorination to precipitate iron and form fresh liquor for leaching said material, (g) separating said material from said secondary liquor and subjecting said secondary liquor at least to chlorine regeneration to form fresh liquor for leaching said material, (h) stripping metal chlorides and chiefly zinc chloride from said tri-n-butylphosphate with an aqueous medium, (i) separating iron and copper chlorides from said aqueous medium and thereafter, and (j) removing and recovering zinc metal from said aqueous medium by electrolysis thereof.

9. The method of claim 8 in which the primary liquor flows in a closed loop and is combined with the secondary liquor at least for chlorine regeneration and in which the combined regenerated fresh liquor is divided into a split flow to supply a portion of said liquor to said primary and secondary leaching steps.

10. The method of claim 8 in which the tri-n-butylphosphate flows in a closed loop and in which the electrolyte for removal of zinc metal flows in a closed loop and constitutes the aqueous medium for stripping metal chlorides from said tri-n-butylphosphate.

11. Method for producing zinc metal from chloride solutions containing iron, copper and zinc by liquid-liquid extraction and electrolysis which comprises the steps of:

(a) forming a chloride solution containing iron, copper and zinc chlorides;

(b) limiting said chloride solution to a copper content of not more than about 50 grams per liter by subjecting the chloride solution to electrolysis to reduce iron chloride to ferrous state and copper chloride to the cuprous state and to remove copper to limit the copper content of said solution to not more than 50 grams per liter;

(c) contacting said chloride solution with tri-n-butylphosphate which selectively extracts and removes zinc chloride from the ferrous and cuprous chlorides in said solution;

(d) separating zinc chloride from said tri-n-butylphosphate; and (e) feeding the separated zinc chloride in aqueous solution into an electrolytic cell in which zinc metal is deposited at the cathode by electrolysis and removed from the cell.

12. Method for producing zinc metal from materials that at least contain copper, iron and zinc by liquid-liquid extraction and electrolysis which comprises the steps of:

(a) leaching said material with an aqueous chloride solution containing ferric and cupric chlorides to extract copper, iron and zinc as chlorides in solution from said material;

(b) subjecting said solution to electrolysis in the cathode compartment of a diaphragm cell to reduce iron chloride to the ferrous state and copper chloride to the cuprous state and to remove copper to limit the copper content to not more than 50 grams per liter;

(c) feeding the chloride solution which contains not more than 50 grams of copper per liter from the cathode compartment of said cell into contact with tri-n-butylphosphate to selectively extract and remove zinc chloride from said ferrous and cuprous chlorides in said solution;

(d) contacting said tri-ni-butylphosphate with an aqueous medium to extract and remove zinc chloride from said tri-n-butylphosphate; and (e) feeding the separated zinc chloride in aqueous solution into an electrolytic cell in which zinc metal is deposited at the cathode by electrolysis and removed from the cell.

* * * * *

UNITED STATES PATENT AND TRADEMARK OFFICE
CERTIFICATE OF CORRECTION

PATENT NO. : 4,465,569
DATED : August 14, 1984
INVENTOR(S) : Arne Bjune et al.

It is certified that error appears in the above-identified patent and that said Letters Patent are hereby corrected as shown below:

On the title page insert:

--[73] Assignee: Elkem a/s, Oslo, Norway--

This certificate will supersede Certificate of Correction issued April 9, 1985.

Signed and Sealed this

Tenth Day of September 1985

[SEAL]

Attest:

DONALD J. QUIGG

Attesting Officer     Acting Commissioner of Patents and Trademarks - Designate